(No Model.)
G. A. GOODWIN & W. F. HOW.
MANUFACTURE OF LOCK NUTS.
No. 396,477. Patented Jan. 22, 1889.
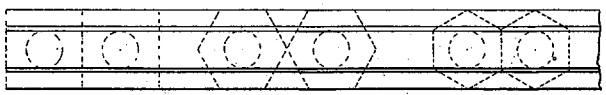
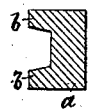
Fig. 2      Fig. 1      Fig. 3
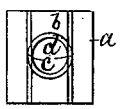
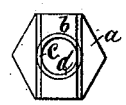
Fig. 4      Fig. 6      Fig. 6a
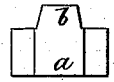
Fig. 5      Fig. 7      Fig. 7a
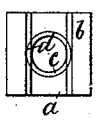
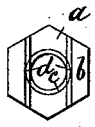
Fig. 8      Fig. 10
Fig. 9      Fig. 11
Witnesses.
George Abraham Goodwin
William Field How
Inventors.

UNITED STATES PATENT OFFICE.

GEORGE A. GOODWIN AND WILLIAM F. HOW, OF WESTMINSTER, COUNTY OF MIDDLESEX, ENGLAND.

MANUFACTURE OF LOCK-NUTS.

SPECIFICATION forming part of Letters Patent No. 396,477, dated January 22, 1889.

Application filed October 19, 1888. Serial No. 288,556. (No model.) Patented in England March 10, 1887, No. 3,654; in Italy December 14, 1887, No. 22,750; in France December 15, 1887, No. 187,619; in Belgium December 16, 1887, No. 79,942; in New South Wales January 4, 1888, No. 481; in Victoria February 3, 1888, No. 5,602; in South Australia February 6, 1888, No. 956; in New Zealand February 20, 1888, No. 2,897; in Spain February 24, 1888, No. 12,495; in Austria-Hungary April 8, 1888; in Portugal April 20, 1888, No. 1,239, and in Queensland May 26, 1888, No. 404.

*To all whom it may concern:*

Be it known that we, GEORGE ABRAHAM GOODWIN and WILLIAM FIELD HOW, of the city of Westminster, in the county of Middlesex, England, have invented a new and useful Improvement in the Manufacture of Lock-Nuts, (which has been patented in foreign countries as follows, to wit: in Great Britain by Letters Patent No. 3,654, dated March 10, 1887; in France by Letters Patent No. 187,619, dated December 15, 1887; in Belgium by Letters Patent No. 79,942, dated December 16, 1887; in Italy by Letters Patent No. 22,750, dated December 14, 1887; in Spain by Letters Patent No. 12,495, dated February 24, 1888; in Austria-Hungary by Letters Patent dated April 8, 1888; in South Australia by Letters Patent No. 956, dated February 6, 1888; in New Zealand by Letters Patent No. 2,897, dated February 20, 1888; in Portugal by Letters Patent No. 1,239, dated April 20, 1888; in Victoria by Letters Patent No. 5,602, dated February 3, 1888; in New South Wales by Letters Patent No. 481, dated January 4, 1888, and in Queensland by Letters Patent No. 404, dated May 26, 1888;) and we do hereby declare the following to be a full, clear, and exact description thereof.

The invention relates to nuts that maintain their position on the bolt or equivalent device on which they are screwed, except when intentionally slackened or screwed back.

The object is to make such nuts of a single piece of metal in a more simple and inexpensive manner than heretofore.

Our invention consists in forging—that is to say, rolling or stamping—a piece of metal or bar with one or more ribs or recesses along one face; in cutting the bar into lengths of the requisite size and shape to form nut-blanks; in punching holes in the blanks; in forming a screw-thread in the metal surrounding the hole, and in diminishing the diameter of the hole through the rib or between the ribs by pressing slightly together the projecting portions of the said rib or ribs.

Figure 1 is a plan of a bar rolled with either a single rib or with two ribs, or a depression. Fig. 2 is a vertical cross-section of a single-ribbed bar, and Fig. 3 is a vertical cross-section of a double-ribbed bar. The dotted lines on Fig. 1 show where the bar is cut and punched to form either square or hexagonal nuts. Fig. 4 is a plan, and Fig. 5 an elevation, of a square nut, and Fig. 6 a plan, and Fig. 7 an elevation, of a hexagonal nut made from a single-ribbed bar. These figures show the rib extending diagonally across the nut from angle to angle. Figs. 6ª and 7ª show a modification with rib extending across the hexagonal nut from one side of the hexagon to the opposite side. Fig. 8 is a plan, and Fig. 9 an elevation, of a square nut, and Fig. 10 a plan, and Fig. 11 an elevation, of a hexagonal nut made from a double-ribbed bar.

Like symbols of reference indicate like parts in each.

In all the modifications under our invention, $a$ is the body of the nut; $b$, rib or ribs forming projecting lugs; $c$, screw-thread through the body of the nut; $d$, screw-thread on the inner faces of the rib-lugs.

In making nuts under our invention a piece of heated metal is forged—that is to say, rolled or stamped by any suitable means—into a bar of the form shown in Figs. 1 and 2 or 1 and 3. The bar is then cut into square, hexagonal, or other shaped nut-blanks—say as shown by the dotted lines in Fig. 1. The holes to be threaded are then punched through the blanks. The punching of the blank forms the hole with projecting lugs on opposite sides of it, in case of the single-ribbed blank the lugs being formed by division or intersection of the rib, and in case of the double-ribbed blank the hole being punched between the ribs. After the punching the blanks are tapped in any usual way, after which pressure is exerted on the rib-lugs to diminish the opening between them and cause the threads on the inner faces of the lugs to tightly grip the bolt when the nut is screwed home.

We claim—

1. In the art of making lock-nuts, the improvement which consists in forming a superficially-ribbed bar or piece of metal, cutting the bar, punching in the blank so formed a hole having the raised or ribbed projections contiguous thereto, and compressing the projections inwardly to form locking-lugs for engagement with the bolt, substantially as and for the purposes described.

2. The method herein described of making lock-nuts, which consists in forming a double-ribbed metal bar or blank, cutting the blank, punching a hole transversely through the ribbed face between the ribs and contiguous thereto, tapping the nut, and compressing the projecting ribbed portions to contract the intervening space, and to form clamping or locking lugs for the bolt, substantially as set forth.

In testimony whereof we, the said GEORGE ABRAHAM GOODWIN and WILLIAM FIELD HOW, have hereunto set our hands.

GEORGE A. GOODWIN.
WM. F. HOW.

Witnesses:
H. CECIL FATT,
L. R. CASEY.